(12) United States Patent
Chudaitov

(10) Patent No.: US 12,443,975 B2
(45) Date of Patent: *Oct. 14, 2025

(54) INFORMATION DISTRIBUTION SYSTEM

(71) Applicant: Raphael Tzmach Chudaitov, Brooklyn, NY (US)

(72) Inventor: Raphael Tzmach Chudaitov, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,942

(22) Filed: Sep. 27, 2023

(65) Prior Publication Data

US 2024/0127290 A1    Apr. 18, 2024

Related U.S. Application Data

(63) Continuation of application No. 17/852,833, filed on Jun. 29, 2022, now Pat. No. 11,620,680, which is a continuation of application No. 17/390,990, filed on Aug. 1, 2021, now Pat. No. 11,416,894, which is a continuation of application No. 15/706,725, filed on Sep. 17, 2017, now Pat. No. 11,080,752.

(51) Int. Cl.
*G06Q 30/0251*    (2023.01)
*G06Q 20/32*    (2012.01)
*G06Q 30/0241*    (2023.01)
*G06Q 50/00*    (2012.01)

(52) U.S. Cl.
CPC ..... *G06Q 30/0265* (2013.01); *G06Q 20/3223* (2013.01); *G06Q 30/0276* (2013.01); *G06Q 50/01* (2013.01)

(58) Field of Classification Search
CPC ........... G06Q 30/0265; G06Q 20/3223; G06Q 30/0276; G06Q 20/223
See application file for complete search history.

(56) References Cited

U.S. PATENT DOCUMENTS

2011/0041174 A1 *    2/2011    Akiyama ................ G06F 21/10
715/738
2014/0333508 A1 *    11/2014    Yuann ................... G06F 3/0346
345/2.1

OTHER PUBLICATIONS

Nataliya Hristova et al, Ad-me: Wireless Advertising Adapted to the User Location, Device and Emotions, 2004, Department of Computer Science, University College Dublin, Belfield, Ireland (Year: 2004).*

* cited by examiner

*Primary Examiner* — E Carvalho

(57) ABSTRACT

An information sharing system with a display screen and a network computing system is disclosed. The display screen may be capable of either being manually moved by a person or move automatically under its own power. The apparatus also includes a power system, a communication subsystem, a memory and a computing device. The communication subsystem communicates with the computing device, the network computing system, and the memory. The network computing system has an end-user display screen. The network computing system is configured to receive media and media secondary information, associate the media and media secondary information to a unique identifier, and show the media and the unique identifier on the display screen. The networking computing system is further configured to receive the unique identifier and an end-user account, and then show the media secondary information on the end-user display screen.

20 Claims, 8 Drawing Sheets

134

Computing Device

Processor 202

Memory 204

Display Control Subsystem 206

Input Subsystem 208

Communication Subsystem 210

FIG. 2

INFORMATION DISTRIBUTION SYSTEM

CROSS-REFERENCE TO RELATED APPLICATIONS

This application is a continuation application of U.S. Non-Provisional patent application Ser. No. 17/852,833 entitled, "INFORMATION DISTRIBUTION SYSTEM" filed Jun. 29, 2022 which is a continuation application of U.S. Non-Provisional patent application Ser. No. 17/390,990 entitled, "PEER SHARE COMMUNITY SYSTEM WITH MOVABLE DISPLAY SCREEN" filed Aug. 1, 2021 which is a continuation application of U.S. Non-Provisional patent application Ser. No. 15/706,725 entitled, "PEER SHARE COMMUNITY SYSTEM" filed Sep. 17, 2017.

FIELD OF THE INVENTION

The present invention relates generally to display devices, and more particularly, to an improved system of using a display device as part of an information sharing system for conveniently exchanging information in a public setting.

BACKGROUND OF THE INVENTION

Current digital information and social platforms, for example Google™ and Facebook®, provide a singular experience with one person on their computer or phone. This approach does not take advantage of gatherings of people in public spaces as found in a city, at social gatherings or community events such as sports games, festivals, concerts, etc.

Currently service companies and subscription-based companies cannot get quick and cost effective messages to consumers in a group setting to take advantage of group dynamics.

Traditional displays like posters have various costs associated with updating the messages on the posters. The costs include printing new posters (paper, ink machine labor etc.), the installation material (tape, glue), the logistics and tracking to make sure all posters are replaced and the time of the workers to replace the physical posters.

For example, when a city's Public Transportation Authority, PTA, needs to update messaging to inform the commuting public, they need to send workers to handle the distribution and installation of paper posters in and around each station (bus stop, train stop, subway) and in every vehicle (e.g. subway train, trains, bus etc.). This takes time, cost money, and makes for a delay in getting messages in front of the public.

As such, there exists a need for an information and social platform that works in a group setting and additionally can provide a cost effective way to timely update messages.

SUMMARY OF THE INVENTION

The present disclosure describes an information sharing system with a display device apparatus and a network computing system. The display device apparatus includes a display screen connected to a base where the base is capable of being manually moved by a person while the base supports its own weight and the weight of the screen. The display device apparatus also includes a power system, a communication subsystem, a memory and a computing device. The power system provides power to the communication subsystem, the computing device, the memory, and the display screen. The communication subsystem communicates with the computing device, the network computing system, and the memory. The network computing system has an end-user display screen. The network computing system is configured to receive media and media secondary information, associate the media and media secondary information to a unique identifier, and show the media and the unique identifier on the display screen. The networking computing system is further configured to receive the unique identifier and an end-user account, and then show the media secondary information on the end-user display screen.

BRIEF DESCRIPTION OF THE DRAWINGS

FIG. 2 is a block diagram of the computing device of FIG. 1.

DETAILED DESCRIPTION

Figure 1:
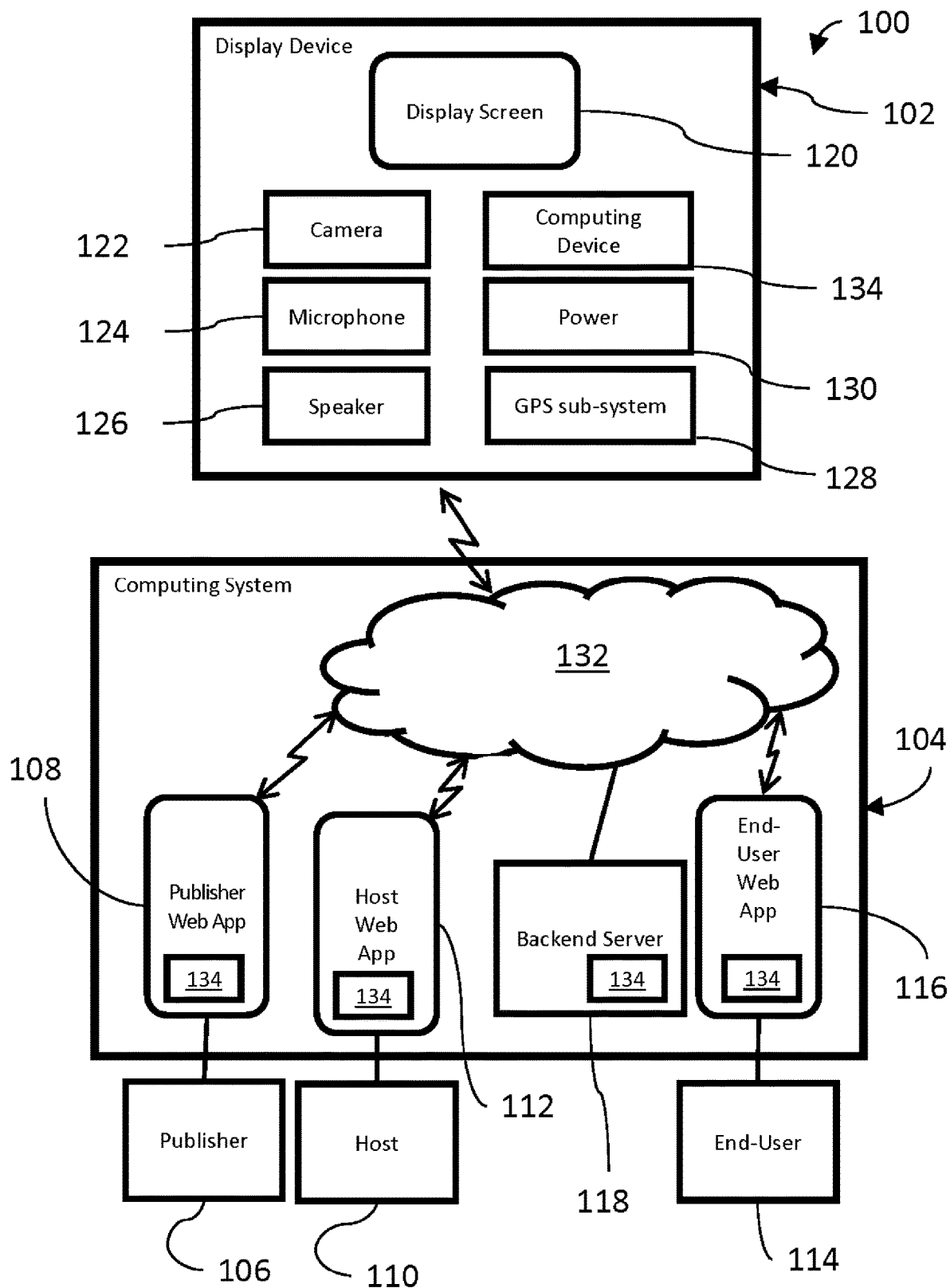
FIG. 1 illustrates one possible configuration of a system used to convey a message in a group setting that provides convenient sharing of information between parties.

FIG. 1 illustrates one possible configuration of a system 100 for conveying a message in a public setting and allowing convenient sharing of data that includes a display device 102 and a network computing system 104.

A person, company or organization may become a user of the system 100 by creating an account. A publisher account 106 may interact to the system 100 through a publisher web-app 108. A host account 110 may interact to the system 100 through a host web-app 112. An end-user account 114 may interact to the system 100 through an end-user web-app 116. The user may create more than one type of account, for example having both the publisher account 106 and the host account 110.

The web-apps (the publisher web-app 108, the host web-app 112 or the end-user web-app 116) may run or be accessible from any number of electronic devices for example a portable electronic device (like a smart phone or tablet computer), a personal computer, a laptop, the display device 102 or any electronic device that is capable of interacting with a user. The web-apps 108, 112 and 116 may be downloaded and install on a portable electronic device, or accessed on a website. The network computing system 104 may make the functionality described in this document available via an Application Programming Interface (API) that may be accessible over the internet. The web-apps 108, 112 and 116 may be available from specific URLs, and the backend server 118 may provide those URLs.

The publisher account 106 may be associated to a business owner, a service company, a subscription company, an advertiser, anyone who wants to interact with the general public or who finds the display device 102 useful. The system 100 may have publisher information associated to the publisher account 106 that may include a publisher name, a publisher social media ID, and publisher contact information (for example a publisher phone number, a publisher email address, a publisher street address, etc.). The publisher account 106 may have login information like a publisher login and publisher password.

The publisher web-app 108 may run on a publisher portable electronic device that has a computing device 134 with a publisher display screen.

The publisher web-app 108 can allow the publisher account 106 to upload media, media secondary information and media campaign details. The system 100 may encrypt the uploaded data so the data is not visible during transit. The system 100 may digitally sign the upload data to insure the media is from the publisher account 106.

The publisher web-app 108 may allow the uploading of media from the publisher portable electronic device, for example, a phone that is running the publisher web-app 108. On receiving the media, the publisher web-app 108 may send it to the backend server 118 and the system 100 may create a media campaign. The system 100 may use the publisher username to distinguish different publishers and restrict access to media campaigns to authorized publisher accounts 106. The publisher web-app 108 may upload the media quickly (for example in under 1 second), in a short period time, or slowly in the background.

Uploaded media may need to pass through an upload filter. The upload filter may exclude or screen-out inappropriate material for various reasons. For example, the upload filter may reject media because the media is obscene, for copyright issues or for any other criteria. The upload filter may include a computer program, a human or a combination of a computer program and a human. The system 100 may use the upload filter to reject media prior to the media becoming part of a media campaign.

The media may consist of various types of modalities. For example, the media modality may be images, video, audio, text, video with audio tracks etc. The media may have more than one modality, for example, a video with an associated audio track. The media may be a personal message for example "come see my blog," a message, an advertisement, an offer for a product, an offer for a service, a logo, a video advertisement etc.

The system 100 may associate the media secondary information to the uploaded media. The media secondary information may include a media secondary message, media contact information (for example a media phone number, a media contact email, a media street address or a media social media ID like a Snapchat® ID), an offer verification prompt, or other useful information.

The publisher web-app 108 may allow the media campaign to have media campaign criteria that specifies criteria about when or where to show the media, for example specific dates, time or times of day, days in the week, geo-targets (for example a specific location), a route and how many display devices 102 to use. The campaign criteria may include the route along which the display device 102 should show the media. The route may be driven, biked, walked or traversed by other means, for example flown or by boat. The campaign criteria may specify to show the media at particular types of establishments, for example grocery stores, bars, sports arenas, coffee shops, etc. Alternatively, the media campaign may indicate particular types of events, to show the media at, for example at or near football games, concerts, festivals, art shows, political conventions, parades, or anywhere there is a gathering of people either indoors or outdoors either public or private. The media campaign criteria may be other criteria deemed useful to associate to the media campaign.

Some media campaigns may have very little or no campaign restrictions. For example, if a major pop manufacturer wants to keep their name and logo in the public eye it may want the media shown at any location. Alternatively, where to show the media campaign may be very geographically restricted, for example only show the media in the neighborhood around the local pizza parlor, for example only show it within 1 mile, or only show it within 10 blocks.

The publisher web-app 108 may show all current campaigns associated to the publisher account 106. The media campaign may be a set of pictures and videos. The media campaign may have a thumbnail image, for example the first picture or first frame of the first video. The user with the publisher account 106 may use the publisher web-app 108 to create, update, enable, disable or delete media campaigns.

To create a new campaign the publisher web-app 108 may have a create-campaign option. To create the new campaign the publisher web-app 108 may prompt to upload an image or video file. The publisher account 106 may then repeat the process and add another picture or video to the campaign. When finished, the publisher account 106 may click to indicate the campaign is complete and that the system 100 should mark the campaign as active and start running it on the display device 102.

The publisher web-app 108 may show the display devices 102 that are currently showing the active media campaigns for a publisher account 106. The system 100 may use the GPS sub-system 128 to get position information. The publisher web-app 108 may provide the publisher account 106 with analytics about the media or media campaign. The analytics may be real-time, for example within one to seven seconds, or provide a summary of analytics for previous time-periods.

The host account 110 may be associated to one or more display devices 102. The host account 110 may have host information, which may include host contact information (for example a host street address, a host email address, a host social media account ID, a host phone number), a host bank account number (for direct deposit), a host geographical area (indicating where they can show media), a host type (vehicle, bike, walking, drone etc.).

The user may login into the host web-app 112 with the host account 110 that is associated to a particular display device 102 and agree to run a media campaign on the display device 102. The host web-app 112 may require the host account 110 to agree to show the media campaign using the media campaign criteria, for example to show the media along the specific route, in a particular geographic area, on a particular day, or during a specific time-of-day. In addition the host web-app 112 may receive, indication that the host account 110 agrees to show the media in accordance with the media campaign criteria that has a combination of criteria for example on a specific route, on a particular day at a specific time or window of time.

The host account 110 may have login information like a host login and host password. The host account 110 may have host information.

The system 100 may help facilitate providing reoccurring revenue to the host account 110 for a new subscriber where the display device 102 helps acquire for a publisher account 106. For example, for a follow-up time-period the system 100 may keep track of money the publisher account 106 owes to the host account 110. The money owed may be a portion of the revenue each time the publisher account 106 receives revenue from the subscription. The follow-up time-period may be weeks, months, years or for the lifetime of the subscription or relationship established between the end-user account 114 and the publisher account 106.

The host account 110 may only be associated to one display device 102. There may be more than one host account 110 associated to a single display device 102. There may be more than one display device 102 associated to a host account 110.

The host account 110 may be associated to a driver of a vehicle like a car. The host account 110 may access the host web-app 112 via a specific URL in a browser. The backend server 118 may host the URL. Alternatively, the URL may provide a file to download that will install the host web-app 112 on a portable electronic device, such as a smart phone.

A user may have a dual account for self-promotion. A dual account has both a publisher account 106 and a host account 110. A dual account user may promote themselves or their business or even host promotions on behalf of other businesses. The dual account may use the display device 102 to express their opinions on topics that are important to them or what they are feeling at that moment, like Snapchat.degree. just on a screen in the public eye.

The dual account may be able to quickly update (less the a few seconds) the media on the display device 102.

For safety reasons, the system 100 may not allow the dual account to update the media message if the display device 102 is moving fast enough to indicate attachment to a moving vehicle. The system 100 may use the change in location reported by the GPS sub-system 128 to assess the speed of the display device 102.

The host web-app 112 may run on a host portable electronic device with a computing device 134 with a host display screen.

The host web-app 112 may ask for a host username and host password. The system 100 may use the host username to distinguish different host accounts 110. The host account 110 may be associated to one or more display devices 102.

The host web-app 112 may show the list of campaigns scheduled to run on the display device 102 and may show the number of times the display device 102 has already run each campaign.

The host web-app 112 may allow a host account 110 to create blacklist criteria that enables the exclusion of certain media campaigns or media types. The host web-app 112 may associate the blacklist criteria to a particular host account 110 or display device 102. The system 100 may use the blacklist criteria to block a particular media campaign from being on the list of campaigns for the display device 102. For example, the blacklist criteria may exclude references to alcoholic beverages, cigarettes, or lingerie. Thus, the blacklist criteria provides the host account 110 control over the media displayed on the display device 102 and thus the media shown can align to particular tastes, interests, or morals.

The host web-app 112 can allow the selection of media campaigns. The host web-app 112 may prompt to accept or reject adding a media campaign to a playlist of the display device 102 for various reasons including acceptance or rejection of the route.

When a person is walking down the street and sees the display device 102 showing media and an associated unique identifier, they may create the end-user account 114 and may enter the unique identifier into the end-user web-app 116. For example, the media could state, "Monthly Shave Club first month free, with free shipping and free returns, download the end-user web-app today and enter 6831 to try our service for free today."

Someone in the general public can create the end-user account 114. The end-user account 114 may be created by a consumer. The end-user account 114 may have end-user information. End-user information may include, an end-user shipping address, end-user contact information (for example, end-user email, end-user street address, end-user phone number), end-user social media ID, end-user credit card information and end-user billing info. The system 100 may transmit the end-user information securely using proper cyber security techniques. The system 100 may store the end-user information securely.

The end-user account 114 may have login information like an end-user login and end-user password. The end-user web-app 116 may run on an end-user portable electronic device with a computing device 134 with an end-user display screen.

The unique identifier may be a series of characters, an icon, a picture, a sound, a gestor or anything a person could do that could be detected by the system 100 and associated to the media. If the unique identifier is a series of characters, the characters may be just numbers, just letters or a combination of both number and letters (i.e. alphanumeric).

The owner of the publisher account 106 may place the unique identifier in other media, like traditional media (for example, TV, radio, magazines, newspaper etc.) or online media (webpages, social media, podcasts, etc.). The other media may instruct the end-user to enter the unique identifier in the end-user web-app 116.

The end-user may enter the unique identifier by various means, for example, a person may enter it with their own finger on a keypad, by speaking it into voice recognition technology, by using QR code technology (Quick Response code technology), by using OCR (Optical Character Recognition) or other technologies.

The unique identifier may be associated to a particular media or the unique identifier may be associated to a particular display device 102, or the unique identifier may be associated to the particular media shown on the particular display device 102.

Once the end-user web-app 116 receives the unique identifier then the end-user web-app 116 may show the media secondary information where the secondary information may be of various forms as described above. For example, the secondary information may prompt for verification for an instant purchase or prompt for verification before the system 100 sends a request for more information to the media contact.

Once the system 100 receives the unique identifier from the end-user web-app 116 the system 100 may send the end-user information or part of the end-user information to the media contact or the publisher contact.

Alternatively, the end-user web-app 116 may prompt for verification and receive verification before taking further action. For example receiving verification of acceptance of an offer in the media secondary message before taking further action of sending the end-user credit card information to the media contact.

The system 100 makes it quick and convenient for an end-user to share end-user information to either the media contact or publisher contact.

The end-user web-app 116 may allow a person passing the display device 102 to provide end-user media. For example if the end-user web-app 116 is running on a portable electronic device, like a cell phone that has a camera, the end-user web-app 116 may allow the uploading of images or video from the camera. The upload filter may reject the end-user media. Alternatively, the display device 102 may take their picture with the camera 122. Seeing their uploaded media on the display screen 120 may provide a sense of instant fame for the person.

The end-user web-app 116 may restrict the end-user account 114 to provide end-user media that is taken right "then and there", i.e. contemporaneously. The end-user web-app 116 may not allow uploading of end-user media that is pre-existing, for example, the end-user web-app 116 may not allow media that was created more than a few minutes ago to be uploaded.

The system 100 may combine the web-apps 108, 112 and 116, in various ways. For example, one web-app could provide the dual functionality of the publisher web-app 108 and the host web-app 112. Alternatively, one web-app could provide the functionality of all three web-apps 108, 112 and 116. A combined web-app may allow navigation to the appropriate section of the web-app, for example see FIG. 10A.

The system 100 may have an administrative (admin) account capable of accessing additional functionality. When the playlist is empty, the display device 102 may show a default static image or show an admin media campaign as described below.

The system 100 may have the admin campaign be a daily news media campaign. The daily news media campaign may only have positive news segments. The system 100 may have a live broadcast media campaign where the media is a live broadcast, where the live broadcast may be from a local TV station. The live broadcast media campaign may be a network news daily segment. The display devices 102 may be in the public eye 24/7 so may make a good broadcast alternative or companion for other media channels.

The backend server 118 may be available 24/7, and may be accessible over the internet. The backend server 118 may have a computing device 134 and communicate with the publisher web-app 108, the host web-app 112, the end-user web-app 116 and the display device 102.

The backend server 118 may be a cloud computing resource, which may have an arbitrary set of computing resources that are at the disposal of the system 100. A third party may provide the cloud computing resources, for example Amazon™ through their Amazon Web Services (AWS), or Rackspace's Public Cloud, Google's Compute Engine, Verizon's Terremark enterprise cloud, a company with hardware running the open source software Eucalyptus, or any other company that makes computing resources accessible over the network. Alternatively, the backend server 118 may be a physical computer. The backend server 118 may have a program in the form of computer executable instructions and a database.

The backend server 118 may have four URLs, one for the publisher web-app 108, one for the host web-app 112, one for the end-user web-app 116, and another URL that the display device 102 may use to get media campaigns, media and media playlists.

The display device 102 optionally includes a display screen 120, a camera 122, a microphone 124, a speaker 126, a GPS sub-system 128, a power system 130 and a computing device 134.

The display device 102 may be of a size that allows it to be stored in a car, home or office and may be for example, 16 inches long, 12 inches high, and 2 inches thick.

The display device 102 may be wearable. The wearable display device 102 may be a small screen that can attach to clothing, for example via magnets, pins, snaps etc. The clothing may be a coat, jacket, shirt, high top sneakers or any clothing item. It may be preferred that the clothing item have external surfaces, so the display screen 120 may be clearly seen by others, for example the back of a jacket. The wearable display device 102 may be a piece of clothing with the display screen 120 integrated into the clothing, for example, a flexible display screen 120 sewn into a shirt.

The display device 102 may attach to any form of transportation on land, sea, or air, motorized or non-motorized, for example boats, anything on wheels (like Recreational Vehicles (RVs), bicycles, Segways, trollies, any sort of board on wheels etc.). The display device 102 may be clamped on a bicycle. The display device 102 may be a cart on wheels attached to the back of a bike. In addition to the display device 102 being attachable, the display device 102 may move under its own power or be pulled or pushed by a person.

Government agencies may use the display device 102 in case of emergencies, amber alerts, etc. People may use the display device 102 for fundraising or awareness. For example, if there is a major catastrophe a charity may have a media campaign prompting, "Enter 6830 into the end-user web-app to donate $1 dollar and save a life."

The display device 102 may be capable of securely attaching to a wall/beam etc. Government agencies such as Public Transportation Authorities, PTA, may use the display device 102 on public buses, trains, trollies, ferries, planes etc. The display device 102 may be mounted in PTA pickup/drop-off areas, for example at the bus stop, subway station or train terminal. The PTA may mount the display device 102 inside public transportation, for example inside a bus, train, plane etc. The system 100 may allow the PTA to change quickly (in a matter of seconds or minutes) the media campaign running on the display devices 102 of the PTA. This enables the PTA to quickly notify the commuting public of route changes and cancellations as well as provide service announcements and emergency announcements.

The document will now describe FIGS. 3, 4, 5 and 6 that illustrate various alternatives for integrating the display device 102 into a display device apparatus. Although the figures show the display device 102 as a separate component of the apparatus, the actual implementation may have the components of the display device 102 (for example, the display screen 120, the power system 130, the camera 122 etc.) integrated throughout display device apparatus, and not self-contained within the display device 102.

Figure 3:
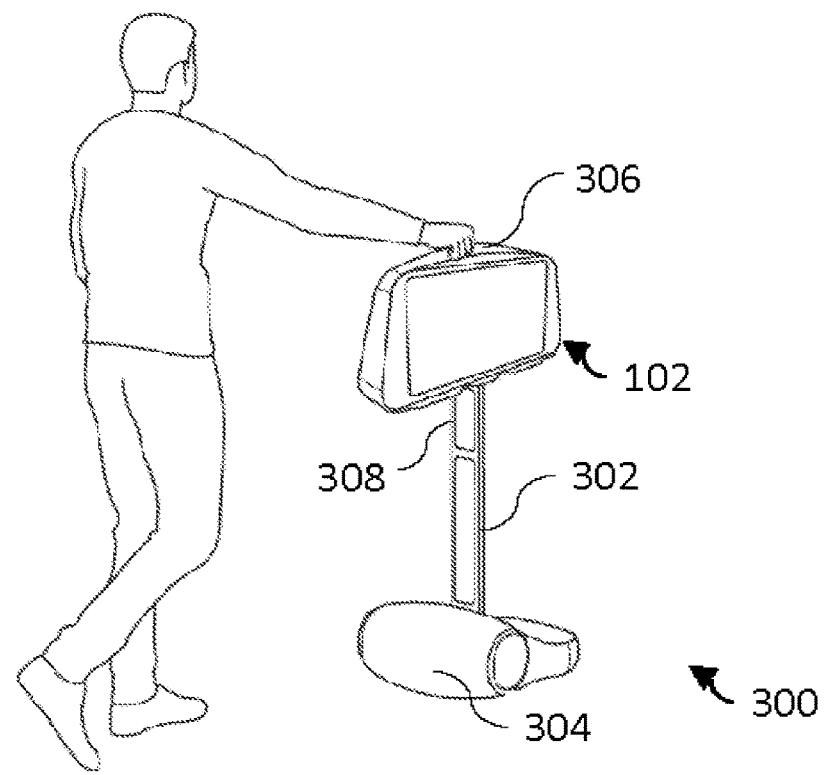
FIG. 3 illustrates a walkable display device apparatus.

FIG. 3 illustrates a walkable display device apparatus 300, where the walkable display device apparatus 300 may be movable or walkable with the display device 102 attached to the top of a neck 302 and the bottom of the neck 302 attached to the top of a base 304 that sits on the ground. The display device 102 can include a handle 306. The neck 302 may be adjustable and may be lockable at a specific height, thus the height of the display screen 120 can be set. The neck 302 may have an alternative handle 308 or the neck 302 may be of a dimension that allows a person to grasp it easily with their hand. The neck 302 may be made of any appropriate material, for example metal or plastic. The base 304 may support the weight of the display device 102 and move easily along the ground. For example, the base 304 may have wheels to allow the walkable display device apparatus 300 to move easily when pushed at the handle 306 or alternative handle 308.

Figure 4:
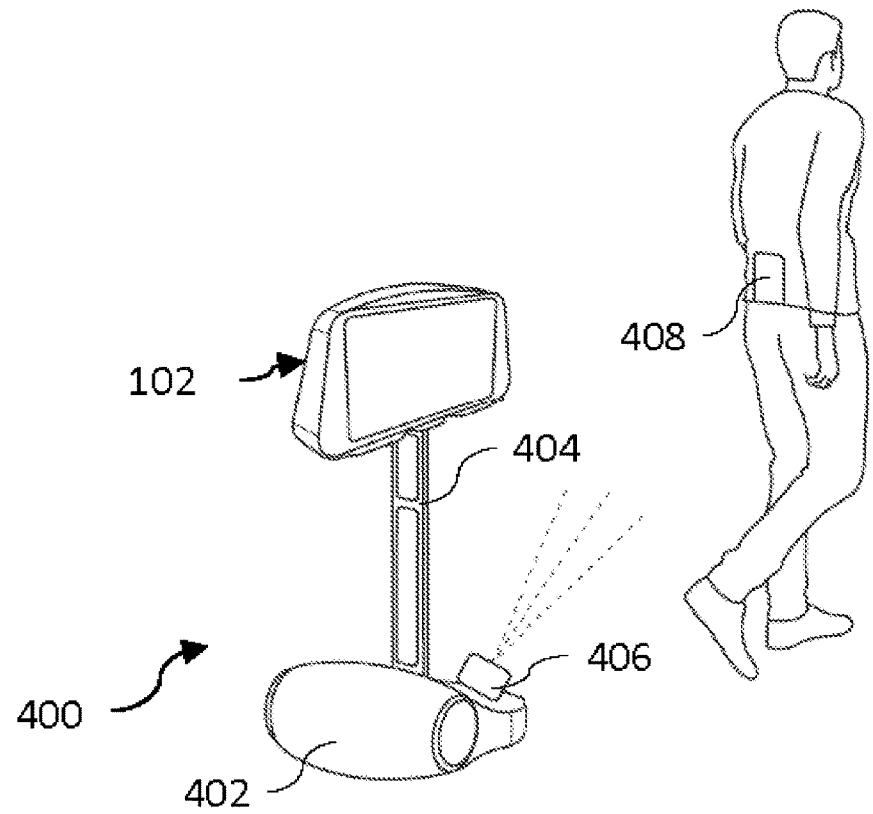
FIG. 4 illustrates a ground drone display device apparatus that may follow a beacon.

FIG. 4 illustrates a ground drone display device apparatus 400. The ground drone display device apparatus 400 may have a ground drone base 402, a neck 404 extending up from the ground drone base 402 with the display device 102 attached to the top of the neck 404. The ground drone base 402 may have a beacon detector 406 that can detect a beacon 408. The ground drone base 402 may have powered wheels.

Figure 5:
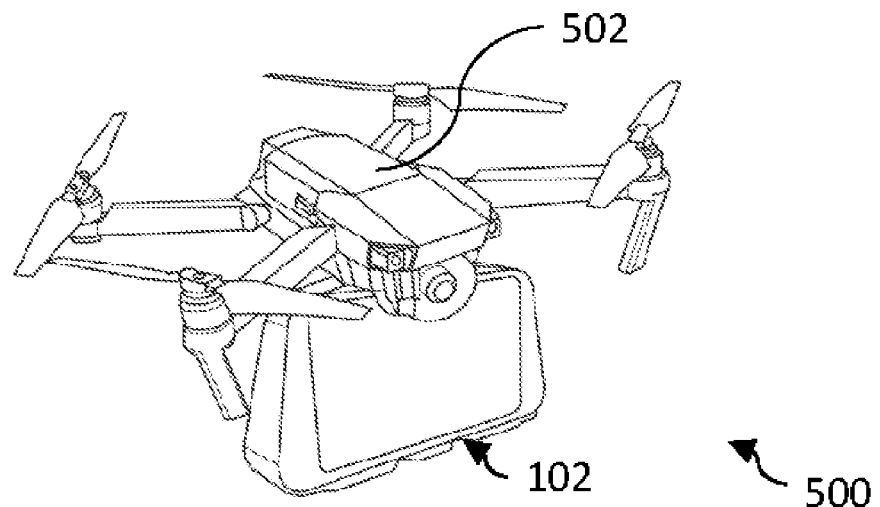
FIG. 5 illustrates a flying drone display device apparatus.

FIG. 5 illustrates a flying drone display device apparatus 500. The flying drone display device apparatus 500 may have a flying drone base 502 and the display device 102 may hang from the bottom of the flying base drone 502. The flying drone display device apparatus 500 may have a beacon detector, not shown. The display device 102 may hang by various means, for example by clips, wires or may attach rigidly to the flying base drone 502. Alternatively, the components of the display device 102 may be integrated into the flying drone base 502.

Either the ground drone display device apparatus 400 or the flying drone display device apparatus 500 (henceforth to be known as drone display device apparatus 400 and 500) may follow an objective, for example a person, a bike or some other type of vehicle etc. The ground drone base 402 or the flying drone base 502 (hereinafter the drone base 402 and 502) may identify the objective to follow by means of a beacon 408 mounted on the objective. The drone base 402 and 502 may follow and remain close to the objective. Alternatively, the drone base 402 and 502 may follow an objective using some other technology such as using the camera 122 to identify the person who is the objective being followed.

A user may control the drone display device apparatus 400 and 500 with a remote control.

The beacon 408 may be a visual beacon, or a wireless beacon signal. The wireless beacon signal may be an existing signal that the drone base 402 and 502 may use as a beacon signal, for example a Bluetooth signal or a Wi-Fi signal that may be broadcast by a portable electronic device. The wireless beacon signal may be another signal specifically generated for the drone base 402 and 502 to follow. A person may have the beacon 408 clipped on their clothes, for example clipped on their belt. If the beacon detector 406 is following a beacon 408 that is a visual beacon then the drone base 402 and 502 may keep in direct visual sight of the beacon 408.

A target person who is the objective to follow may wear the beacon 408 so the drone can follow them. The drone display device apparatus 400 and 500 may follow the target person wherever he/she walks. The drone display device apparatus 400 and 500 may follow the objective at all times when in operation.

With the ground drone display device apparatus 400 a person doesn't have to push or pull or carry the display device 102, it can automatically follow them within a short distance, for example one to five feet.

A person using the flying drone display device apparatus 500 without the beacon detector 406 may use the remote control to locate of the flying drone display device apparatus 500.

The drone display device apparatus 400 and 500 may be autonomous, and follow a route or some other path to carry out the media campaign according to the media campaign criteria.

Figure 6:
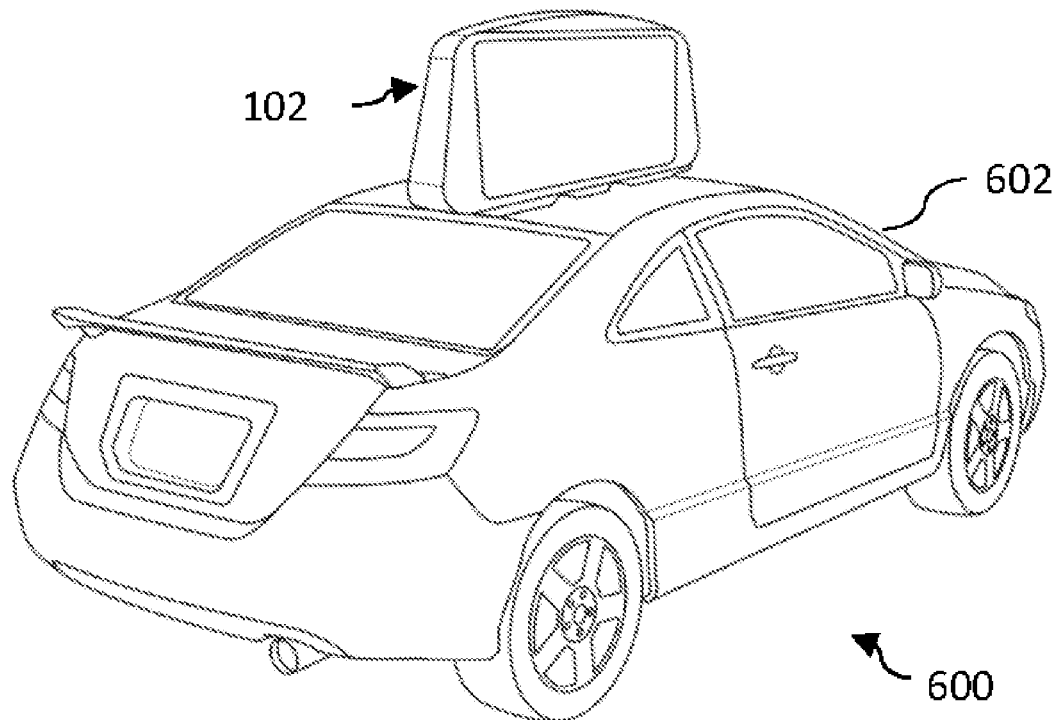
FIG. 6 illustrates the display device apparatus mounted on the top of a vehicle.

FIG. 6 illustrates a display device 102 mounted on the top of a vehicle 602. The vehicle 602 may be a self-driving car or any autonomous form of transportation. The display device 102 may have the ability to securely attach to the vehicle 602, for example, it may have magnets, suction cups, straps or other means to secure it in an intended location.

The document will now return to FIG. 1, to describe the details of the components of the display device 102.

The display screen 120 may be a Liquid Crystal Display (LCD), Light Emitting Diode (LED), Organic LED, a projector, a projection screen, or use any other technology that can display an image. If the display screen 120 is a projector then the projection screen that receives the media, may be a traditional projection screen (either front or back) or any surface such as a wall, the side of a building, the side of real estate property or anywhere there is a space that can have an image projected onto it. In the projector version of the display device 102, the display screen 120 may be the surface receiving the projection, the projector, or the projector and the surface. A person may move the projector from one location to another.

The display screen 120 can show media, for example images and video. The display screen 120 may be internal or external. The system 100 may have the display screen 120 physically integrated in the display device 102. The display device 102 may have a video port (for example HDMI) connected to an external display screen 120 like a HDMI TV or monitor.

In this document when the word show is used for media and if the media is of other modalities besides pictures and video show means the system 100 takes appropriate action to render the particular media modality, for example showing media that is an audio track will play that audio track over the speaker 126.

The display screen 120 may be of various sizes for example mini (e.g. less than 4".times.4"), small (between 4".times.4" but smaller than 8.5".times.11") or large (e.g. greater than 8.5" by 11").

There may be more than one display screen 120 on the display device 102, for example, the display device 102 may have display screens 120 on both the left side and the right side of the display device 102.

The display screen 120 may have features that enable it to hang in a window. For example, the features for hanging may include hooks, suction cup, slot, string magnets, etc. The display screen 120 may be hung from the inside frame of a window. The window may be a store window, a building house or apartment with foot traffic and the display screen 120 may hang where people can see it.

The display screen 120 may be a 3D display, for example a holographic display using laser plasma, micro magnetic piston display or other technology the allows a viewer to see an image as three dimensional without additional equipment. If the display screen 120 is 3D then the media may be 3D or if not 3D then technology in the system 100 may display some rendition of the media in 3D, for example showing text media as floating in 3D.

The camera 122 may be located above or near the top of the display screen 120. The display device 102 may have more than one display device 102 for example if the display device has more than one display screen then the display device may have a camera 122 for each display screen 120.

The system 100 may use the camera 122 to create a security recording. The display device 102 may have a theft detection ability. For example, the display device 102 may have a sensor that will activate when a person gets too close (like a motion sensor or human proximity sensor etc.). Then if the display device 102 is in a secure mode, where the display device 102 expects to remain in its current location, then if the display device 102 detects a person getting too close the display device 102 may decide it is under threat of theft. Alternatively, a contact sensor may let the display device 102 know it is being lifted off its current location, and again if in secure mode the display device 102 may determine it is being stolen. If the display device 102 determines it is under threat of theft or it is being stolen, the display device 102 may start recording the images from the camera 122 to make a security recording. So, if someone does try to take the display device 102 the display device 102 may send the security recording to the backend server 118 and the system 100 may send the security recording to the authorities The microphone 124 may be located near the camera 122 or near the display screen 120. The microphone may be orientated to capture the audio coming from the same location that the camera 122 sees.

The speaker 126 may be located near the display screen 120 and project sound in the area that can see the display screen 120.

The GPS sub-system 128 may provide the display device 102 with the ability to determine its location, for example using the Global Positioning System (GPS), GLONASS (Russia's version of GPS), using triangulation or multilateralization from cell phone towers or WiFi Positioning technology like fingerprinting or other techniques that can provide information about location.

The system 100 may record the location information provided by the GPS sub-system 128 to track where the device is and where it has been. The display device 102 may send to the backend server 118 a media display report about what media the display screen 120 showed and where the display screen 120 was located at the time of the showing. The system 100 may store the history of the location of the display device 102 and what media it was showing at each location, thus providing information about the media that it was showing along a media campaign route. The system 100 may use the location history information to provide information for analytics reports. The system 100 may allow the publisher account 106 to track a live media campaign. The live media tracking may include providing analytical data feedback in near real-time (e.g. under seven seconds or under a few of minutes) or non-real-time.

The power system 130 provides electrical power to the display screen 120, the camera 122, the microphone 124, the speaker 126, the computing device 134 and the GPS subsystem. The power system 130 may include a battery. The battery may be rechargeable, for example by plugging in a USB, mini-USB, micro-USB or another kind of power supply plug. The battery may be rechargeable with a specific amount of voltage for example 5 Volts or 12 Volts. Alternatively, the battery may be rechargeable from another battery, for example a power bank. The display device 102 may plug into a standard power-grid plug, for example a 120 Volt AC wall plug to recharge the battery. The power system 130 may not have a battery but instead be powered directly from a standard 120 Volt AC power-grid or be directly wire into a vehicle 12 Volt DC system.

The Power system 130 may include solar technology, for example solar cells may be mounted on the top of the display device 102. The solar or other renewable energy may provide the display device 102 with additional power to help extend the time the power system 130 can power the display device 102 before it needs to plug into a power source for recharging.

The network computing system 104 may include a backend server 118 and portable electronic devices running the web-apps 108, 112 and 116 using a network 132 that provides the functionality described in this document.

In general, the network computing system 104 and the computing device 134 may employ any of a number of computer operating systems, for example the Linux operating system (Linux® is a registered trademark of Linus Torvalds), the Microsoft Windows® operating system, the Mac OS X and iOS operating systems distributed by Apple Inc. of Cupertino, Calif., the Android operating system developed by the Open Handset Alliance, or other operating systems.

The network computing system 104 generally includes computer-executable instructions, where the instructions may be executable by one or more computing devices such as those listed above. Computer-executable instructions may be compiled or interpreted from computer programs, for example created using a variety of programming languages and/or technologies, for example C, C++, C #, Java, Visual Basic, Java Script, Perl, Python, PHP, Node.js, Go, Objective C, Rudy, Assembly language etc.

The system 100 may implement some functionality on computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described in this document.

Databases, data repositories or other data stores may save the data described in this document, such as the media, media campaign, media campaign criteria, playlists, the publisher account 106, the end-user account 114 etc. The network computer system 104 may include various kinds of mechanisms for storing, accessing, and retrieving various kinds of data, including a hierarchical database and relational database, a set of files in a file system, an application database in a proprietary format, a relational database management system (RDBMS), etc. Each such data store is generally included within the computing device 134 employing a computer operating system as mentioned in this document, and are accessed via the network 132 in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language.

FIG. 2 is a block diagram of the computing device 134. The computing device 134 may have a processor 202, a memory 204, a display control subsystem 206, an input subsystem 208 and a communication subsystem 210.

The processor 202 may execute machine-readable instructions. The processor 202 may execute the instructions on one or more virtual or physical electronic processing devices. For example, the processor 202 may execute instructions to perform steps and processes described in this document. The processor 202 may include one or more processors to execute the machine-readable instructions.

The memory 204 may include computer-readable medium that contains instructions that the processor 202 can execute. The computer-readable medium (also referred to as a processor-readable medium) may include any non-transitory ephemeral (like not radio waves), or tangible medium that participates in providing data (e.g., instructions) that may be read by the processor 202 of the computing device 134. Such a medium may take many forms, including, but not limited to, non-volatile media and volatile media. Non-volatile media may include, for example, optical or magnetic disks, solid-state memory, a floppy disk, a flexible disk, a hard disk, a magnetic tape, any other magnetic medium, a CD, a CD-ROM, a DVD, any other optical medium, punch cards, paper tape, any other physical medium with patterns of holes, ROM (Read Only Memory), a PROM (Programmable Read Only Memory), an EPROM (Erasable Programmable Read Only Memory), a FLASH-EPROM, a USB drive (e.g. Thumb Drive), SD cards, any other memory chip or cartridge, other persistent memory, or any other medium from which a computer can read. Volatile media may include, for example, include RAM (Random Access Memory) like static random access memory (SRAM) or dynamic random access memory (DRAM), which typically constitutes a main memory.

The memory 204 may hold the items described in this document for example the media, the playlists, related information and computer executable instructions.

The display control subsystem 206 may facility displaying the media by sending signals to the display screen 120. The computing device 134 may provide an integrated display control subsystem 206, memory 204, and processor 202 such that computing device 134 executes machine readable media to provide the methods described in this document.

The input subsystem 208 may receive user input. The input subsystem 208 may connect to and receive input from devices such as a mouse, a keyboard, a touch screen, a touch screen with a keyboard on it a, touch screen with a number keypad on it, the microphone 124, the camera 122. For example, a user may indicate that the computing device 134 is to execute a certain task, such as requesting the computing device 134 display any of the information described in this document.

The communication subsystem 210 may allow execution of the methods described in this document over the network 132. For example, the communication subsystem 210 may enable the computing device 134 to communicate with a plurality of personal computing devices running the web-apps 108, 112 and 116 or one or more servers, for example the backend server 118.

The communications subsystem 210 may receive computer instructions for the processor 202, and those instructions may be stored in the memory 204.

The communication subsystem 210 may communicate with the network 132 by one or more transmission media, including wired (coaxial cables, copper wire and fiber optics, including the wires that comprise a system bus coupled to a processor 202 of the computing device 134) or wireless.

The communication subsystem 210 may be equipped to communicate over many technologies that may be part of the network 132. For example, the communication subsystem 210 may be equipped with a WiFi module that connects to mobile hotspots (via WiFi) which may connect to the internet. Wireless communication may include a cellular wireless network, Wi-Fi communications network, a wired Ethernet network, or any communication means that facilitate networked communication with other computing devices. In addition, the communication subsystem 210 may be capable of communicating via any number of short-range wireless technologies for example Bluetooth, Near Field Communication (NFC), ZigBee, infrared, Wide Area Network (WAN), etc.

The communication subsystem 210 may provide a list of connections available to pick from, for example, it may provide a list of Wi-Fi connections that are in-range. The list of connections may contain a home Wi-Fi, a mobile hotspot, a temporary hotspot from a phone, or any other Wi-Fi hotspots that the communication subsystem 210 detects. The display device 102 may present the list of Wi-Fi connections available and may accept a selection of which one is preferred to use.

In general, the processor 202 may receive instructions, for example from the memory 204 and executes those instructions, thereby performing the functions described in this document. Such instructions and other data may be stored and transmitted using a variety of computer-readable media.

The network 132 may include the internet, or may include some other computer network composed of wired and wireless technology. The wired technology may include electrical wire (for example, Ethernet, HomePNA, power line communication, G.hn etc.), optical fiber (fiber-optic communication) or other physically connected communication technology. The wireless technology may include using radio waves (wireless networking such as WiFi, 802.11, Bluetooth, WiMax etc.), microwaves or other electromagnetic waves.

Now that the components of the display device 102 have been described, the document will describe how the system 100 manages the media the display device 102 shows using a playlist.

The display device 102 may have a playlist that provides a schedule of media or media campaigns to show. The playlist may include images and videos from the active media campaigns. The system 100 may base the playlist on all the media campaigns criteria. The backend server 118 may provide the playlists to the display devices 102. In addition to the playlist describing the sequence to show the media, the playlist may also specify the location to show the media.

The playlist may be specific to each display device 102. The playlist may exclude media from the display device 102 based on the blacklist.

Whenever a change in the media campaigns occurs—for example, the host web-app 112 receives a new media campaign or modifies or removes an existing media campaign—then the backend server 118 may build new playlists for all the display devices 102. The system 100 may send updated playlists to the display devices 102.

The system 100 may have the display device 102 complete the existing playlist, or may interrupt the existing playlist and replace it with the new playlist. The new playlists may use existing media that does not require downloading again, as the media may already be stored in the memory 204 of the computing device 134 of the display device 102. The system 100 may have the display device 102 download all the new media not already present on the display device 102 in the background, while the existing playlist keeps playing. Once the system 100 has downloaded all the media onto the display device 102 then the display device 102 may switch to the new playlist. Alternatively, the system 100 may stream the media to the display device 102 and immediately switch to the new playlist.

The display device 102 may have a separate process or method running to remove media from memory if the memory 204 is too full.

Figure 7:
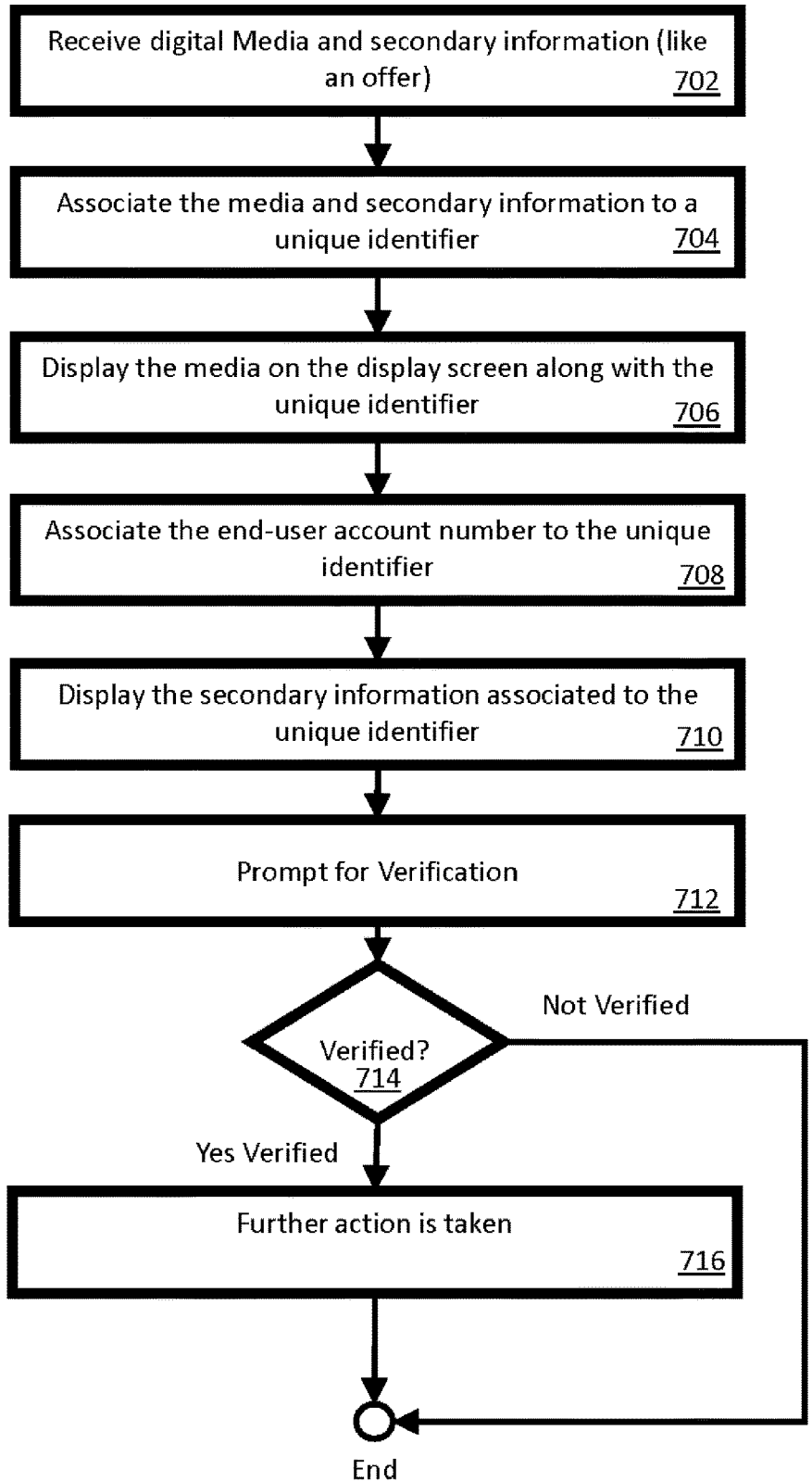
FIG. 7 illustrates one possible overall process flow of the system.

FIG. 7 illustrates a process 700 that the system 100 may use as an overall system flow.

The process 700 may start at box 702 by receiving the media and media secondary information. The system 100 may receive the media and media secondary information through the host web-app 112. The media secondary information may include an offer, details of a subscription service, or a media social media ID, as described above.

The process 700 may continue at box 704 where the media and media secondary information is associated to the unique identifier, for example a 4-digit code like 1234, as described above. The system 100 may do the association in a database on the backend server 118.

The process 700 may continue at box 706 were the media may be shown on the display devices 102. Next at box 708, the end-user account may be associated to the unique identifier. For example, the end user may have logged into the end-user web-app 116 with a particular end-user account and then the end-user web-app 116 may have receive the unique identifier that a user entered. For example, if the unique identifier is numeric then the user with the end-user account 114 may enter the unique identifier on a keypad after they see the unique identifier on the display device 102. If the unique identifier is an icon then the end-user web-app 116 may show a series of icons then receiving the unique identifier may occur when the end-user web-app 116 has the icon selected.

After receiving the unique identifier at box 708, the process 700 may continue at box 710 where the system 100 may show the media secondary information associated to the media. For example, the system 100 may show the secondary information on the display device 102. The secondary information may be an offer for a subscription as described above. The media secondary information may be a message for completing a purchase or inquiring about an item or a service. If the media promotes making a purchase then the media secondary information may be item details and prompt to review those details before verifying the purchase.

Once the end-user web-app 116 receives the unique identifier, then the end-user web-app 116 may present the secondary media information. The secondary media information may describe an item or service. The end-user account 114 may need to provide verification to move forward, for example accept the media secondary message.

The process 700 may continue at box 712 where the system 100 may prompt for verification. For example, the end-user web-app 116 may request that the end-user provide verification of acceptance of an offer from the media secondary information.

At decision diamond 714 the process 700 may receive verification and then continue to box 716. The system 100 may use different means to receive verification, for example no-click, clicking verify or selecting an icon.

One possible verification method is the end-user web-app 116 may request to receive the unique identifier again. The system 100 may consider verification received when the end-user web-app 116 receives the unique identifier for a second time. When the unique identifier is character based then when the end-user web-app 116 receives the last character the end-user web-app 116 may consider the verification complete. This approach to verification allows a user of the end-user web-app 116 to never have to click a confirm button, hence providing a no-click option.

Alternatively, for verification when the unique identifier is an icon, the verification process may be the end-user web-app 116 presenting a set of icons, then requesting verification by selecting the icon that is the unique identifier. The system 100 may select the set of icons based from the display devices 102 in close proximity to the electronic device running the end-user web-app 116. Alternatively, the set of icons may be a large set of icons in which case a filter may be used. The filter may be text entered as search criteria. For example "to subscribe to the social media feed of local-comedian Andrew please select the joker face icon." Where the joker face icon is the unique identifier that the display device showed with the media. The system 100 may consider the verification complete with the selection of the joker face icon.

Alternately, instead of the icons, the end-user web-app 116 may go through the same procedure but with pictures replacing the icons.

The verification may be a button that says, "click here to verify" and the system 100 may consider verification complete when the button is clicked.

At box 716 the system 100 may take some further action. If the media secondary message is for an end-user to receive more information, then the further action may be to send the end-user contact information to the media contact. For example, the publisher may have provided in the media secondary information a media contact email, and the end-user web-app 116 may send an email to the media contact email requesting more information be sent to the end-user contact email.

If the media was advertising a product and the media secondary message was purchasing details then the further action may be to send the end-user payment and billing information to the publisher so that they can be paid before shipping out the item. Alternatively, the system 100 may charge the end-user credit card and provide all the proceeds to the publisher account 106, or provide the proceeds remaining after a commission is deducted.

By using the unique identifier, the end-user can avoid entering their end-user information (for example end-user contact, social media ID, etc.) each time they are interested in the message of the media, because the end-user information is entered once, stored securely and provided to the media contact or publisher contact when the end-user wants the end-user information sent.

Alternatively, at the decision diamond 714 the process 700 may receive a not verified response, in which case the process 700 may end.

Figure 8:
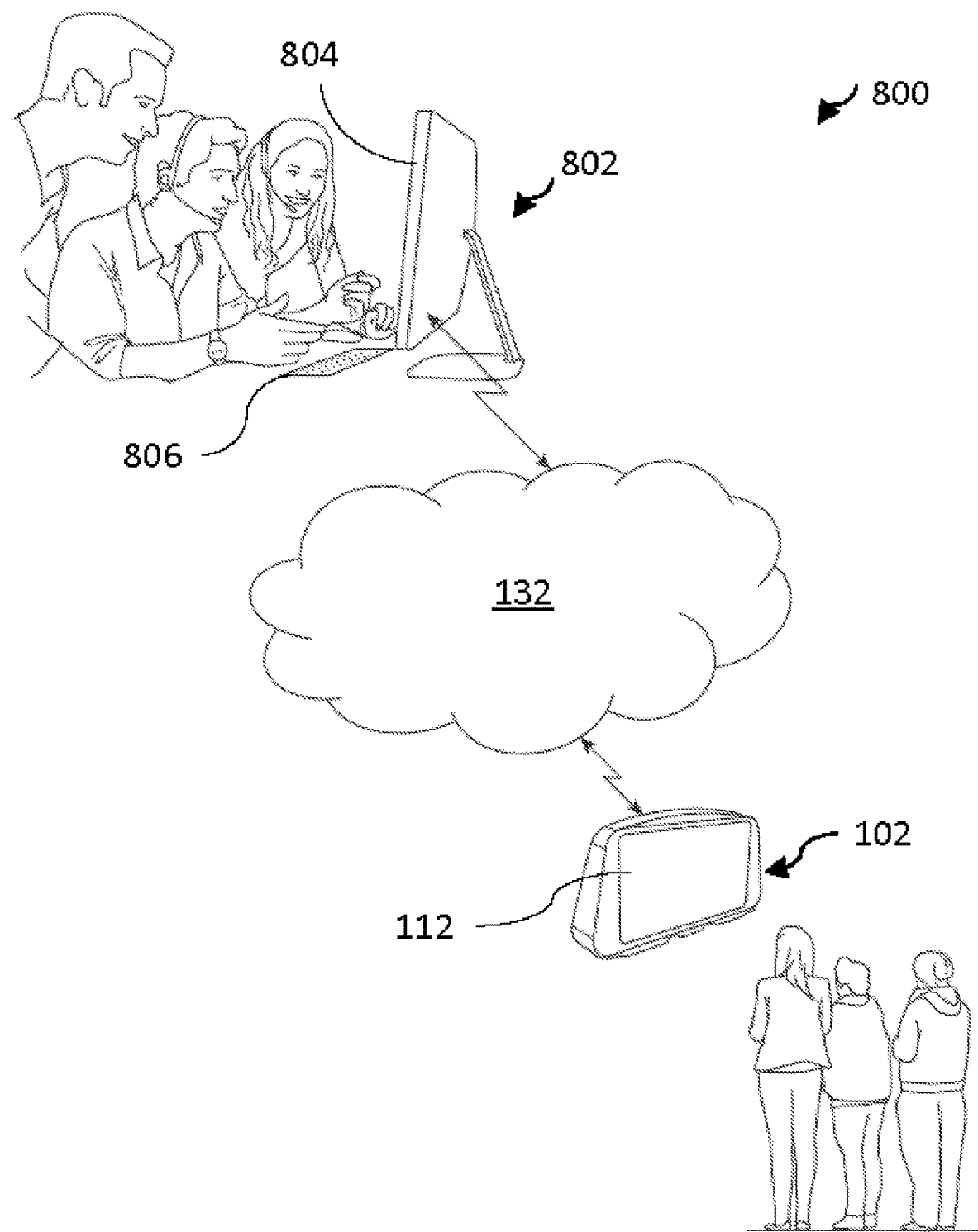
FIG. 8 illustrates the system configured to provide two-way communication.

FIG. 8 illustrates a sub-system 800 of the system 100 where the sub-system 800 may provide two-way communication between the display device 102 and a remote computer 802. The display device 102 may provide reaction media that the sub-system 800 displays at the remote computer 802, and the remote computer 802 may provide feedback media to the display device 102, thus providing two-way communications. The remote computer 802 may be running the publisher web-app 108, or some other web-app specifically for two-way communication.

The reaction media may be media coming from input devices on the display device 102, like the camera 122, the microphone 124, text input, video or audio provided from the end-user web-app 116. For example, the reaction media may be a live a video stream from the camera 122 that the sub-system 800 may show on a remote computer screen 804 of the remote computer 802.

A network of display devices 102 may gather people and end-user reaction data (pictures, video, sound, count of unique identifiers entered, verifications received) and the system 100 may provide analytics about the gathered reaction data.

The system 100 may allow the admin account to upload media and create an admin media campaign to use when no other media campaigns are available, for example, when there is no media campaigns booked for that day, time and location.

The admin account may have media campaigns that includes the display device 102 prompting people as they pass by. The display device 102 may use the speaker 126 to say something like "Take a quick live photo here with your friends, and or family or solo—download the end-user web-app now and enter code 6829." The end-user web-app 116 may allow an end-user to take and/or record a solo/ group end-user media, for example a photo or a few second of video that may be shown on the display device 102. The display device 102 may show, "Want to provide a shout-out to your friends, record your message and it can be seen on this screen." This may be particularly appealing in a public space with a large display screen 120 when a user knows their friends are around to see the shout-out on the large display screen 120.

Once the end-user web-app 116 receives the end-user media and a unique identifier for a unique identifier display device 102 then the system 100 may display the end-user media on the unique identifier display device 102. The system 100 may display the end-user media on other display devices 102 near the unique identifier display device 102. Alternatively, the system 100 may display the end-user media on other available display devices 102. The other available display devices 102 may be in some geographic area, for example the local neighborhood, city, state, nationwide or worldwide.

The remote computer 802 may provide feedback media to the display device 102, for example the sub-system 800 may provide feedback media as a feedback audio stream playing on the speaker 126 or a feedback video showing on the display screen 120 or the feedback media may be text displayed on the display screen 120.

An example use of the two-way communication may be the sub-system 800 displaying for the media campaign the reaction media (e.g. a video from the camera 122) on the remote computer 802. The reaction media video may show a person wearing a green shirt. The sub-system 800 may allow a remote microphone (not shown) on the remote computer 802 to capture audio that the sub-system 800 then plays on the speaker 126 of the display device 102. The audio may be something like "Nice green shirt, you look awesome" or "Nice green shirt, you look awesome go to www--.com, or download the end-user web-app to learn more about our product." Alternatively, the system 100 could generate the audio feedback media by means other than the remote microphone.

The sub-system 800 may have feedback media as text received from a remote keyboard 806 on the remote computer 802. The sub-system 800 may show the feedback media on the display screen 120. For example, the feedback media could be text entered on the remote keyboard 806 or generated by the system 100 like "Nice green shirt." Then if the response media indicates the viewer notice the text then the system 100 could update the feedback media to say, "Yes, you in the green shirt, you look great."

The sub-system 800 may have feedback media as video received from a remote camera (not shown), or generated by the system 100. The sub-system 800 may display the feedback media video on the display screen 120. For example, the feedback media could be video of a person looking at the response video and pointing at the green shorts and with the other hand giving an approving thumbs-up. The system 100 may ask for permission from the subject (i.e. the person wearing the green shorts) before the system 100 shows subject in the feedback media.

The feedback media may be any combination of text, audio video or other media types.

The remote computer 802 may be a portable electronic device running the publisher web-app 108. The publisher web-app 108 may show the response media and gather feedback media that it sends to the display device 102. If the portable electronic device is a smart phone then the publisher web-app 108 may receive feedback media as text entered on a keyboard or the audio from a microphone or video from a video camera of the smart phone.

The display device 102 may accept voice commands and have the camera 122 take pictures. A person walking by the display device 102 may be able to issue voice commands to the display device 102, like one does with Apple® 's Siri or Amazon®'s Echo. For example a person may ask, "please take our picture," "is it going to rain now?" or other questions. The person may be able to say "my name is Rachel if you see me again say hi" and the display device 102 may take a picture of Rachel using the camera 122. The display device 102 may ask a person walking by "Hi, may I ask you your name". The person may answer, "My name is Rachel." The display device 102 may ask Rachel if it can take their picture or a short video. If Rachel agrees then the display device 102 may say "Thanks Rachel, if I see you again may I say 'hi'." If Rachel agrees then if the display device 102 recognizes Rachel again then the camera 122 may recognize Rachel through video/voice recognition software or other means and the display device 102 may say "Hi Rachel, so nice to see you again".

If a person wants to have their photo or a short video posted live on the display screen 120 that they are in front of, for everyone around to see, they may have an option to do so. The system 100 may charge a small amount to broadcast the recorded media (e.g. the picture, short video clip, etc.) to that display device 102 or many display devices 102. The picture may have a lower priority and the system 100 may only display it on the display device 102 when other higher priority media campaigns are unavailable.

The system 100 may support the building of community by providing facilities to construct special offers of interest to members of the community. The community may be comprised of people associated to end-user accounts 114; or the end-user accounts 114 and the host accounts 110; or the end-user accounts 114, the host accounts 110 and the publisher accounts 106.

Additionally, the system 100 may facilitate information gathering to allow construction of transactions, for example, the system 100 may provide functionality like Kick-Starter® or Groupon® or their combination. The system 100 may facilitate communicating a special offer from a manufacturer. The system 100 may record the end-user accounts 114 that affirm they are interested in an offer and enable that offer only after a certain number of end-user accounts 114 verify their interest in the offer.

The end-user web-app 116 may facilitate the end-user account 114 to request any specific item. If enough end-user accounts 114 request the item or service then the system 100 may facilitate contacting the company with the item and inform them of the number of end-user accounts 114 interested or verified as willing to pay for the item or service. The system 100 may further suggest the company get a publisher account 106 and put out a media campaign with the secondary information being an offer to reach out to those end-user accounts 114 that expressed interest.

For example, the system 100 may support the initiation of a survey to which the system 100 may record which end-user accounts 114 have indicated they are interested in purchasing an item at a specific price. If enough users commit to buy an item (e.g. an "item of the day" like a hover board), then the system 100 may facilitate contacting the product manufacturer/distributer and inform them that a large order for that specific item is available to them if they can provide a particular lower price. For example, the system 100 may present an opportunity of getting a hover-board for $199. If 1,000 end-user accounts 114 indicate that they are interested in purchasing the hover-board if they could purchase it for $199, then the system 100 may facilitate contacting the hover-board manufacturer to see if they would be interested in fulfilling the 1,000 orders at $199. The end-user web-app 116 may enable an end-user account 114 to request interest in a specific concerts or artists, if enough end-user accounts 114 request the same concert/artist then the system 100 may facilitate reaching out to concert or artist manager to help enable the event to happen.

The system 100 may also facilitate providing community group benefits for example a group branded credit card, a group credit card with special features, group insurance discounts, group insurance coverage, etc.

The system 100 may record that the publisher account 106 owes money to the host account 110 when the end-user web-app 116 receives verification from the end-user account 114 to accept an offer from the media secondary information.

Reports and credits may be tracked through the unique identifier being associated to the display device 102, or may be tracked by other means such as the location of the display device 102 relative to the location of the portable electronic device running the end-user web-app 116 that provides end-user account 114 entering the unique identifier.

The end-user web-app 116 may receive the unique identifier. The unique identifier may be associated to the media and the end-user web-app 116 may receive verification (for example verification of subscription), then the system 100 may share some or all of the end-user information with the publisher account 106 via the publisher contact information. Alternatively, the system 100 may send some of the end-user information to the media contact.

An end-user account 114 may be able to enter in the end-user web-app 116 the unique identifier, for example entering a numeric code, verify their interest and then the system 100 may subscribed to a new service. The subscription may result in an item being shipped out the next business day, no further action may be required from the end-user. Alternatively, the unique Identifier may also be associated to the display device 102 or the display device 102 and media. The system 100 may provide the unique identifier on the display screen 120 in the form of a QR code.

The end-user account 114 may be able to cancel a subscription, and end-user web-app 116 may be able to receive notification that the end-user account 114 wants to return an item. A system 100 may provide a prepaid return shipping label to the end user street address or provide it electronically to print. The end-user account 114 may need to use the return shipping label within 30 days. If the offer was a subscription and if it was a trial with the first 30 days free, then the end user may not have to wait for a refund, as the system 100 may not have yet charged the credit card to begin with.

The display device 102 or the end-user web-app 116 may prompt to provide a shout-out to businesses or a brand. The shout-out may be the end-user reaction or an endorsement or them reading a statement. The system 100 may capture the shout-out and make it part of a media campaign. The display device 102 or the end-user web-app 116 may prompt and capture the answer if the end-user is willing to allow the system 100 to use the shout-out in a promotional media campaign.

The system 100 may have a large set of the display devices 102 that may be in the public eye where the system 100 may expose media and media campaigns to thousands of people through the set of the display devices 102.

The camera 122 in the display device 102 may record or show a live stream of how people are reacting to the media. The recording may be stored on the backend server 118 and then the publisher web-app 108 may provide it later for review. The reaction medias stored on the backend server 118 for a particular media campaign may be summarize by the system 100 to provide an analysis of the reaction to the media campaign or media in a media campaign.

With the display device 102 being in public spaces there can be many people, for example 30 people, opting in to an media's offer by entering a unique identifier, for example "6829" could be entered to try out a subscription to Monthly Shave Club at the same time from just one display device 102.

Figure 9:
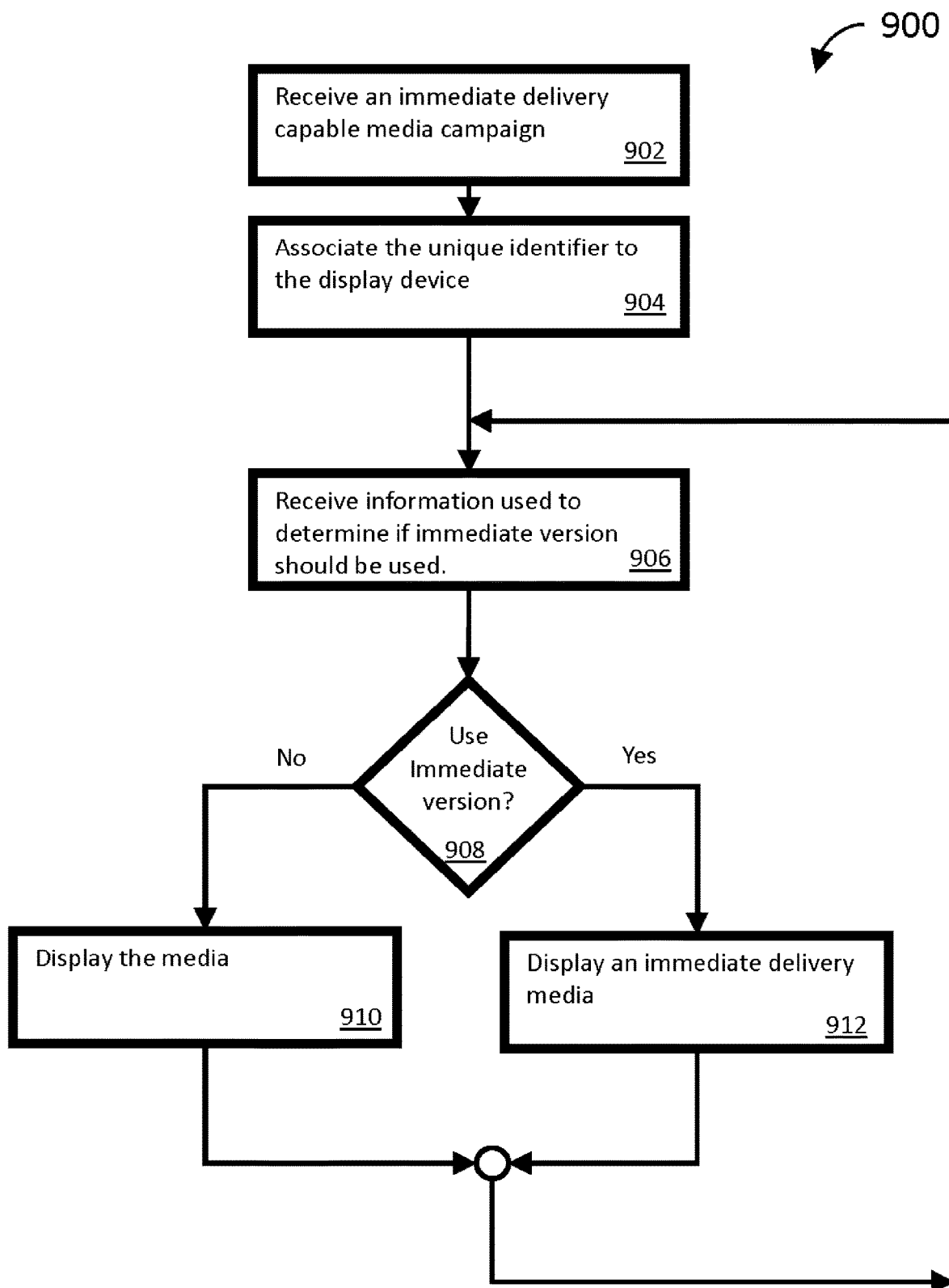
FIG. 9 illustrates a process the system may use to provide an immediate delivery message.

FIG. 9 illustrates a process 900 as a process flow the system 100 may use to determine to display the media or an alternative immediate delivery media. The process 900 may start at box 902 where the system 100 receives an immediate delivery capable media campaign. The immediate delivery capable media campaign has both media and an alternative immediate delivery media. The system 100 may use the immediate delivery media as an alternative to the media when an immediate delivery indicator says immediate delivery is available. The publisher web-app 108 may provide a way to indicate that the media campaign is immediate delivery capable and the publisher web-app 108 may provide facilities to upload the immediate delivery media.

The immediate delivery media may be entirely different media content or it may be the same media content with just wording indicating immediate delivery of a product is available or it may only be an indicator that immediate delivery is available in which case the system 100 could adjust the media to indicate immediate delivery is available. The system 100 may adjust the media by adding the text "Immediate delivery available" to the media, be it video, or text, or add the spoken words immediate delivery available if the media is audio, or adjust the media as appropriate for other types of media.

Next, the process 900 may continue at box 904 where the process 900 may associate the unique identifier to the display device 102. With the unique identifier associated to the display device 102 then at box 906 the system 100 may receive information that the system 100 may use to determine if the system 100 should use the immediate delivery message.

The system 100 may receive various types of information that it may consider in determining to use the immediate delivery media. For example, the system 100 may receive information about inventory associated to the display device 102, or inventory associated to the host account 110 of the display device 102. Alternatively, the host web-app 112 may prompt if immediate delivery is available and the system 100 may store the response in an indicator of immediate delivery availability.

Next, the process 900 may continue at decision diamond 908. At the decision diamond 908, the system 100 may determine to use the immediate delivery media. For example, if the information received is that the inventory associated to the display device is above zero then the system 100 may decide to use the immediate delivery media. Alternatively, if the indicator of immediate delivery availability is yes then the system 100 may decide to use the immediate delivery media.

If the information received is the inventory associated to the host account 110 then the system 100 may look to the host location and see if it is within a short distance of the display device 102, and if it is within a short distance then the system 100 may use the immediate delivery media. The host location may be the host street address, or the location of the portable electronic device that is running the host web-app 112 that is associated to the host account 110. Alternatively, the system 100 may use the location of the portable display device 102 as the host location. A short distance may be a variety of distances, for example 10 yards, 1 mile, or within a 5-minute drive or 1-hour drive.

If the information is the indicator of immediate delivery availability then the decision to use the immediate delivery media just requires looking at the indicator.

If at the decision diamond 908 the system 100 decides to use the regular media then the process continues at box 910 and the regular media is used. Once the system 100 displays the regular media then the process 900 returns to the box 906.

If at the decision diamond 908 the system 100 decides to use the immediate delivery media then the process 900 continues at box 912 and the immediate delivery media is used.

The system 100 may provide an advantage to the ways an end-user becomes a subscriber because it lets the end-user receive immediate delivery of the product instead of having to wait days for it to arrive in the mail. For example, if the offer is to join a monthly razor subscription service, with the immediate delivery option, instead of having to wait days for the initial razor to come in the mail the end-user may have the razor handed right to them at the time of the subscription. This approach may help facilitate new subscriptions through impulse buying and herd mentality. In addition, the immediate delivery may save shipping costs. Getting the product instantly may also enable billing to begin earlier.

As an incentive to create new end-user accounts 114 if a subscription comes from a new end-user account 114 the system 100, or the publisher account 106, may offer the first month free.

After the end-user account 114 verifies the acceptance of the media secondary information, then there are at least three ways to do the immediate delivery. First, if the item is with the display device 102, then hand over the item to the end-user if they are insight of the display device 102. Second, display a message on the end-user web-app 116 instructing the end-user to go to the display device 102, and once they arrive then hand the end-user the item.

Third, the system 100 may have the host web-app 112 display instruction to wait for the end-user to come pick up the item, or alternatively, the system 100 may have host web-app 112 may display a message to go and deliver the product to an end-user location. The end-user location may be the location of the portable electronic device that is running the end-user web-app 116 or the end-user location may be the end-user shipping address. The end-user location may be a location in the end-user web-app 116.

The system 100 may only have the host web-app 112 display instructions to deliver the item once the end-user web-app 116 has received verification or received verification and received payment.

The display device 102 may be located near a busy foot traffic and the media campaign may be the message "free samples come on over and get one today" that can be displayed on the displays screen 120. In addition, while the media campaign is on the display screen 120 the system 100 may gather reaction media.

After the process 900 displays the immediate delivery media, the process 900 may continue back at box 906 where the system 100 may receive information that the system 100 can use to determine if the system 100 may use the immediate delivery media. For example, the host web-app 112 may prompt if the system 100 should use the immediate delivery media. Alternatively, the host web-app 112 at the box 906 may prompt to know how much to reduce the inventory by.

Figure 10A:
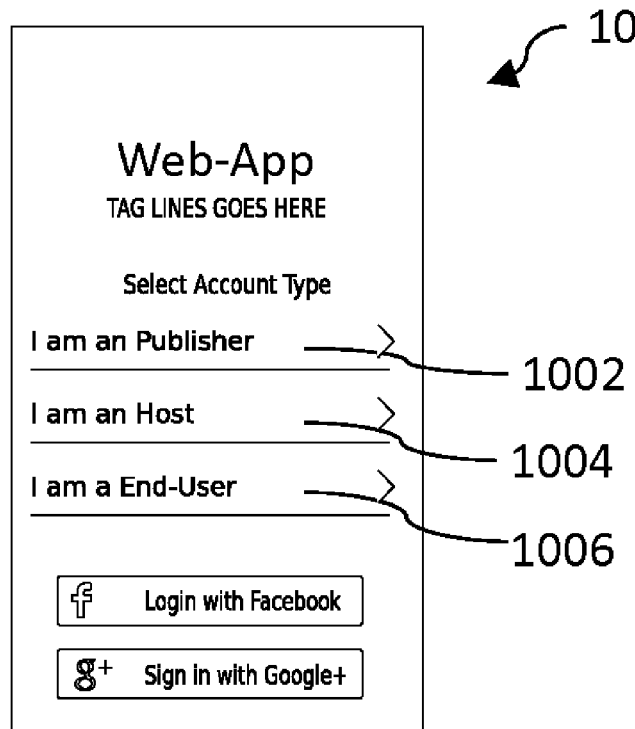
FIGS. 10A and 10B show potential screen shots for the web-apps of the system.
Figure 10B:
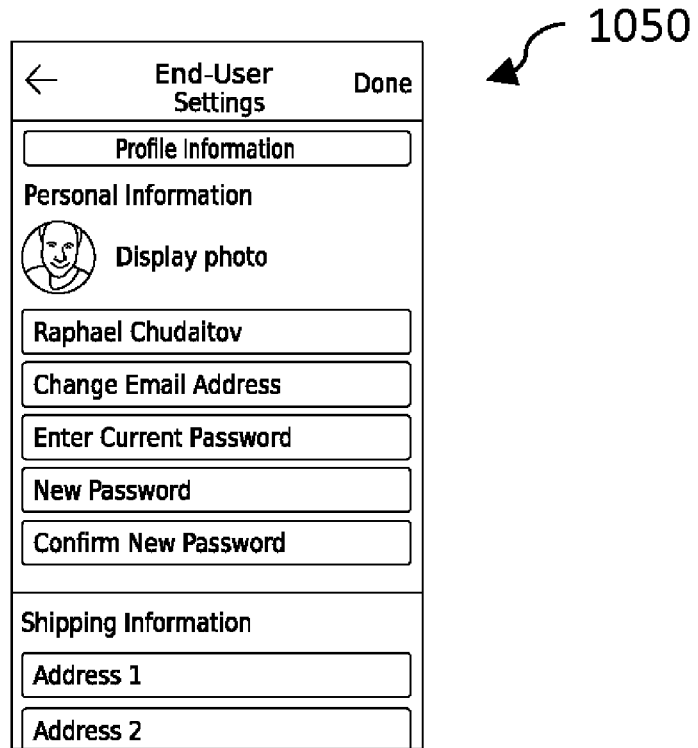

FIGS. 10A and 10B show potential web-app screens. FIG. 10A shows a possible screen 1000 for a combined web-app. On the possible screen 1000 the web-app may accept a selection 1002 that may go to the functionality of the publisher web-app 108; accept a selection 1004 that may go to the functionality of the host web-app 112; and accept a selection 1006 that may go to the functionality of the end-user web-app 116.

FIG. 10B shows a second possible screen 1050 for the end-user web-app 116, where the second possible screen 1050 shows an end-user information input screen.

With regard to the processes, systems, methods, heuristics, etc. described in this document, it should be understood that, although the document describes the steps of such processes, etc. as occurring in a certain sequence, in practice the processes might follow a different sequence. Further, although the system 100 may have described certain steps performed simultaneously, other steps may be added, or that certain steps described may be omitted. In other words, the descriptions of processes provided are for illustrating certain embodiments, and in no way limit the claims.

Accordingly, it is to be understood that the above description is intended to be illustrative and not restrictive. Many embodiments and applications other than the examples provided would be apparent upon reading the above description. The scope should not be determined with reference to the above description, but should instead be determined with reference to the appended claims, along with the full scope of equivalents to which such claims are entitled. It is anticipated and intended that future developments will occur in the technologies discussed in this document, and that the disclosed systems and methods will incorporate such future developments. In sum, it should be understood that the application is capable of modification and variation.

All terms used in the claims are intended to be given their broadest reasonable constructions and their ordinary meanings as understood by those knowledgeable in the technologies described unless there is an explicit indication to the contrary in this document. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, the following claims reflect inventive subject matter with less than all features of a single disclosed embodiment. The following claims are hereby incorporated into the Detailed Description, with each claim standing on its own as separately claimed subject matter.

What is claimed is:

1. A method for providing information to a display device, comprising:

receiving, by a network computing system, a media and media secondary information, and a media campaign criteria;

associating, by the network computing system, the media and media secondary information to a unique identifier related to the display device;

providing, from the network computing system for receipt by the display device, the media and the unique identifier for display on the display device based on the media campaign criteria, wherein the display device comprises a movable display screen, the network computing system, a communication subsystem, a Global Positioning System (GPS) sub-system, and a computing device, wherein the movable display screen is capable of either being manually moved by a person or move automatically under its own power;

receiving, by the network computing system, location information from the GPS sub-system, associated with the display device to verify conditions related to location co-ordinates that are provided in the media campaign criteria;

receiving, by the network computing system, the unique identifier and an end-user account information from an application running on an end-user device; and sending the media secondary information to the application running on the end user device in response to receiving the unique identifier and the end-user account information.

2. The method of claim 1, wherein the display device is mounted to a movable device and the media campaign criteria further comprises:

displaying the media and media secondary information on the display device at location co-ordinates at dates and times.

3. The method of claim 2, wherein conditions related to routes included in the media campaign criteria are verified by location information received from a position tracking system associated with the display device.

4. The method of claim 2, further comprising: configuring the movable device as a drone.

5. The method of claim 1, further comprising:
configuring a solar cell mounted on the display device as a power source for the display device.

6. The method of claim 1, further comprising:
configuring the display device with theft detection technology.

7. The method of claim 1, further comprising:
configuring the display device to include a plurality of features facilitating attaching the display device to a window.

8. The method of claim 7, wherein the plurality of features are selected from a group consisting of hooks, suction cups, slots, strings, and magnets.

9. The method of claim 1, wherein the unique identifier is selected from a group consisting of a series of characters, an icon, a picture, a sound, a gesture, a quick response (QR) code, and an image.

10. The method of claim 1, wherein the media campaign criteria further comprises:

providing media campaign features selected from a group consisting of advertisements, endorsements, and surveys.

11. The method of claim 10, further comprising:
providing a web application facilitating communication with a plurality of end users and wherein the web application supports collection of information related to the media campaign features.

12. The method of claim 11, wherein the collected information includes product requests, prices related to the product requests, product delivery options, user identity verification, automatic selection, event requests, service requests, and incentives.

13. The method of claim 12, wherein the identify verification utilizes an access to the unique identification previously stored by a validated end user.

14. The method of claim 12, wherein the automatic selection takes place responsive to receiving a last character of a second reception of the unique identification when the unique identification is a character string.

15. The method of claim 12, wherein the web application negotiates prices and delivery options with providers base on the collected information.

16. The method of claim 15, wherein the delivery options include an immediate delivery category.

17. The method of claim 12, wherein the web application automatically provides an incentive for creating a new account for a new user for a subscription.

18. The method of claim 17, wherein the incentive is a free introductory period of time for the subscription.

19. An information handling system for providing information to a display device, comprising:

a movable display screen, a network computing system, a communication subsystem, a Global Positioning System (GPS) sub-system, and a computing device, wherein the movable display screen is capable of either being manually moved by a person or move automatically under its own power;

one or more processors; a memory coupled to at least one of the processors; a network interface that connects the display device to one or more remote web sites; and a set of computer program instructions stored in the memory and executed by at least one of the processors in order to perform actions comprising:

receiving, by a network computing system, a media and media secondary information, and a media campaign criteria;

associating, by the network computing system, the media and media secondary information to a unique identifier related to the display device;

providing, from the network computing system for receipt by the display device, the media and the unique identifier for display on the display device based on the media campaign criteria;

receiving, by the network computing system, location information from the (GPS) sub-system, associated with the display device to verify conditions related to location co-ordinates that are provided in the media campaign criteria;

receiving, by the network computing system, the unique identifier and an end-user account information from an application running on an end-user device with an end-user display screen; and displaying the media secondary information on the end-user display screen in response to receiving the unique identifier and the end-user account information.

20. A non-transitory computer program product for providing information, to a display device, stored in a computer readable storage medium, comprising computer program code that, when executed by the computer program product, performs actions comprising:

receiving, by a network computing system, a media and media secondary information, and a media campaign criteria;

associating, by the network computing system, the media and media secondary information to a unique identifier related to the display device;

providing, from the network computing system for receipt by the display device, the media and the unique identifier for display on the display device based on the media campaign criteria, wherein the display device comprises a movable display screen, the network computing system, a communication subsystem, a Global Positioning System (GPS) sub-system, and a computing device, wherein the movable display screen is capable of either being manually moved by a person or move automatically under its own power;

receiving, by the network computing system, location information from the (GPS) sub-system, associated with the display device to verify conditions related to location co-ordinates that are provided in the media campaign criteria;

receiving, by the network computing system, the unique identifier and an end-user account information from an application running on an end-user device; and sending the media secondary information to the application running on the end user device in response to receiving the unique identifier and the end-user account information.

* * * * *